United States Patent
Oh

(10) Patent No.: US 10,708,510 B2
(45) Date of Patent: Jul. 7, 2020

(54) IMAGE OBTAINING METHOD AND APPARATUS

(71) Applicant: Samsung Electronics Co., Ltd., Suwon-si (KR)

(72) Inventor: Dokwan Oh, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 55 days.

(21) Appl. No.: 15/805,741

(22) Filed: Nov. 7, 2017

(65) Prior Publication Data

US 2019/0037118 A1 Jan. 31, 2019

(30) Foreign Application Priority Data

Jul. 31, 2017 (KR) .................. 10-2017-0097068

(51) Int. Cl.
*H04N 5/238* (2006.01)
*H04N 5/235* (2006.01)
*H04N 5/232* (2006.01)
*G03B 7/00* (2014.01)
*G03B 29/00* (2006.01)
*H04N 5/243* (2006.01)

(52) U.S. Cl.
CPC .......... *H04N 5/2352* (2013.01); *G03B 7/003* (2013.01); *G03B 29/00* (2013.01); *H04N 5/238* (2013.01); *H04N 5/2351* (2013.01); *H04N 5/2353* (2013.01); *H04N 5/23222* (2013.01); *H04N 5/23254* (2013.01); *H04N 5/243* (2013.01)

(58) Field of Classification Search
CPC combination set(s) only.
See application file for complete search history.

(56) References Cited

U.S. PATENT DOCUMENTS

| 7,023,333 | B2 | 4/2006 | Blanco et al. |
| 2007/0073484 | A1* | 3/2007 | Horibe ............. G01S 17/023 701/301 |
| 2009/0225189 | A1 | 9/2009 | Morin |
| 2010/0141736 | A1* | 6/2010 | Hack ................. G01C 11/00 348/36 |
| 2011/0128380 | A1 | 6/2011 | Tsuruta et al. |

(Continued)

FOREIGN PATENT DOCUMENTS

| EP | 1 767 960 A1 | 3/2007 |
| JP | 2008-48066 A | 2/2008 |

(Continued)

OTHER PUBLICATIONS

Communication dated Oct. 2, 2018 issued by the European Intellectual Property Office in counterpart European Application No. 18158135.6.

*Primary Examiner* — Dave Czekaj
*Assistant Examiner* — Samuel D Fereja
(74) *Attorney, Agent, or Firm* — Sughrue Mion, PLLC

(57) ABSTRACT

A method of obtaining an image from an image sensor provided in a vehicle includes obtaining a vehicle speed of the vehicle; adjusting a shutter speed of the image sensor; adjusting either one or both of an international organization for standardization sensitivity (ISO) of the image sensor and an aperture of the image sensor based on the vehicle speed; and obtaining the image from the image sensor based on the adjusted shutter speed and the adjusted either one or both of the ISO and the aperture.

18 Claims, 9 Drawing Sheets

(56) References Cited

U.S. PATENT DOCUMENTS

| | | | |
|---|---|---|---|
| 2012/0002045 A1* | 1/2012 | Tony | G06K 9/209 |
| | | | 348/143 |
| 2015/0163390 A1 | 6/2015 | Lee et al. | |
| 2015/0244920 A1 | 8/2015 | Akiba | |
| 2016/0180176 A1 | 6/2016 | Yamamoto | |
| 2016/0344929 A1* | 11/2016 | Gyotoku | H04N 5/23222 |
| 2017/0104911 A1* | 4/2017 | Ramsay | H04N 5/144 |

FOREIGN PATENT DOCUMENTS

| | | |
|---|---|---|
| JP | 2008-60874 A | 3/2008 |
| JP | 2008-174078 A | 7/2008 |
| JP | 2009-163506 A | 7/2009 |
| JP | 2010-250503 A | 11/2010 |
| JP | 2011-229066 A | 11/2011 |
| JP | 2014-135613 A | 7/2014 |
| JP | 2016-196233 A | 11/2016 |
| KR | 10-2010-0111053 A | 10/2010 |
| KR | 10-2011-0047482 A | 5/2011 |
| KR | 10-1499502 B1 | 3/2015 |
| KR | 10-1625538 B1 | 6/2016 |
| WO | 2015/083640 A1 | 6/2015 |

* cited by examiner

IMAGE OBTAINING METHOD AND APPARATUS

CROSS-REFERENCE TO RELATED APPLICATIONS

This application claims the benefit under 35 USC § 119(a) of Korean Patent Application No. 10-2017-0097068 filed on Jul. 31, 2017 in the Korean Intellectual Property Office, the entire disclosure of which is incorporated herein by reference for all purposes.

BACKGROUND

1. Field

The following description relates to an image obtaining method and an image obtaining apparatus.

2. Description of Related Art

Recently, various cutting-edge technologies have been applied to vehicles in order to improve convenience for drivers and vehicle safety due to development of the automobile industry. In particular, the number of technologies using images of an environment around a vehicle photographed by a camera provided in the vehicle has been rapidly increasing. To use such cutting-edge technology in a vehicle traveling at a relatively high velocity in various environments and conditions such as darkness, snow, and rain, high-quality images may be needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided method of obtaining an image from an image sensor provided in a vehicle, the method including: obtaining a vehicle speed of the vehicle; adjusting a shutter speed of the image sensor; adjusting either one or both of an international organization for standardization sensitivity (ISO) of the image sensor and an aperture of the image sensor based on the vehicle speed; and obtaining the image from the image sensor based on the adjusted shutter speed and the adjusted either one or both of the ISO and the aperture.

The adjusting of the shutter speed may include increasing the shutter speed in response to an increase in the vehicle speed; and the adjusting of the either one or both of the ISO and the aperture may include performing either one or both of an adjustment for increasing the ISO and an adjustment for opening the aperture.

The adjusting of the shutter speed may include adjusting the shutter speed to be faster in response to the vehicle speed being an angular vehicle speed sensed when the vehicle is turning, than in response to the vehicle speed not being the angular speed.

The adjusting of the shutter speed may include adjusting, in response to an initial image obtained from the image sensor including an object, the shutter speed based on a relative speed between the object and the vehicle.

The adjusting of the shutter speed may include increasing the shutter speed in response to an increase in the relative speed between the object and the vehicle.

The adjusting of the shutter speed may include adjusting, in response to an initial image obtained from the image sensor including an object, the shutter speed based on a type of the object.

The adjusting of the shutter speed may include adjusting the shutter speed to be faster in response to the object being a neighboring vehicle than in response to the object being a pedestrian or a stationary object at a predetermined position.

The adjusting of the shutter speed may include: determining the type of the object, and adjusting the shutter speed to be faster in response to the type of the object being a neighboring vehicle than in response to the type of the object being a pedestrian or a stationary object.

The adjusting of the shutter speed may include adjusting the shutter speed to be slower in response to the object being a stationary object at a predetermined position than in response to the object being a neighboring vehicle or a pedestrian.

The adjusting of the shutter speed may include adjusting the shutter speed based on the vehicle speed; and the adjusting of either one or both of the ISO and the aperture comprises: determining a brightness based on light sensed by the image sensor at the adjusted shutter speed, and adjusting either one or both of the ISO and the aperture based on the brightness.

The adjusting of either one or both of the ISO and the aperture based on the brightness may include adjusting either one or both of the ISO and the aperture so that the brightness is greater than a predetermined threshold.

The adjusting of either one or both of the ISO and the aperture based on the brightness may include: adjusting the ISO based on the brightness, and adjusting the aperture in response to another brightness based on light sensed by the image sensor at the adjusted ISO being less than a predetermined threshold.

The adjusting of the shutter speed of the image sensor based on the vehicle speed may include: estimating an amount of blur of initial image obtained from the image sensor provided in the vehicle moving at the vehicle speed, and adjusting the shutter speed based on the estimated amount of blur.

The adjusting of the shutter speed based on the vehicle speed may include increasing the shutter speed in response to an increase in the estimated amount of blur.

The method of obtaining the image from an image sensor may further include: verifying whether the vehicle is stopped, wherein the obtaining of the vehicle speed, the adjusting, and the obtaining of the image are iteratively performed until the vehicle is stopped.

A non-transitory computer-readable storage medium may store instructions that, when executed by a processor, cause the processor to perform the method of obtaining the image.

In another general aspect, there is provided an image obtaining apparatus for obtaining an image from an image sensor provided in a vehicle, the image obtaining apparatus including: a processor; and a memory comprising at least one instruction executable by the processor, wherein, in response to the instruction being executed by the processor, the processor is configured to: obtain a vehicle speed of the vehicle, adjust a shutter speed of the image sensor, adjust either one or both of an international organization for standardization sensitivity (ISO) of the image sensor and an aperture of the image sensor based on the vehicle speed, and obtain the image from the image sensor based on the adjusted shutter speed and the adjusted either one or both of the ISO and the aperture.

The processor may be configured to: increase the shutter speed in response to an increase in the speed, and perform either one or both of an adjustment for increasing the ISO and an adjustment for opening the aperture.

The processor may be configured to: adjust the shutter speed based on the vehicle speed, and adjust either one or both of the ISO and the aperture based on the adjusted shutter speed.

The processor may be configured to: adjust the shutter speed based on the vehicle speed, determine a brightness based on light sensed by the image sensor at the adjusted shutter speed, and adjust either one or both of the ISO and the aperture based on the brightness.

The processor may be configured to adjust either one or both of the ISO and the aperture so that the brightness is greater than a predetermined threshold.

In another general aspect, there is provided a method of obtaining an image from an image sensor, the method including: determining a speed of an object; adjusting a shutter speed of the image sensor based on the speed; adjusting either one or both of a sensitivity of the image sensor and an aperture of the image sensor based on the adjusted shutter speed; and obtaining the image from the image sensor, wherein the image is captured by the image sensor at the adjusted shutter speed and at the adjusted either one or both of the sensitivity and the aperture.

The adjusting either one or both of the sensitivity and the aperture based on the adjusted shutter speed may include either one or both of: increasing either one or both of the sensitivity and a size of the aperture in response to an increase in the shutter speed, and decreasing either one or both of the sensitivity and a size of the aperture in response to a decrease in the shutter speed.

The object may be either one of the image sensor or an object included in the image.

Other features and aspects will be apparent from the following detailed description, the drawings, and the claims.

Figure 1:
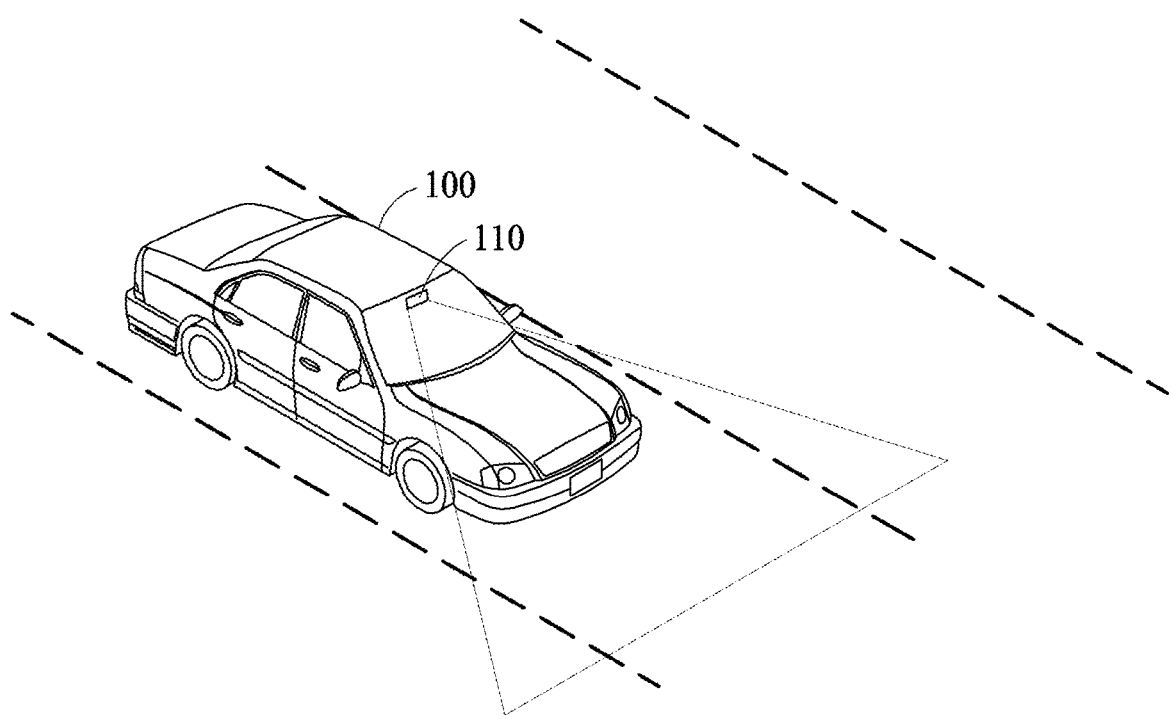
FIG. 1 illustrates an example of obtaining an image from an image sensor provided in a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood after an understanding of the disclosure of this application. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

FIG. 1 illustrates an example of obtaining an image from an image sensor provided in a vehicle.

FIG. 1 illustrates that an image sensor 110 is provided in a vehicle 100.

The image sensor 110 may be included in the vehicle 100. For example, the image sensor 110 is fastened to a predetermined position, for example, a windshield, a dashboard, and/or a rear-view mirror, of the vehicle 100, to photograph a front view of the vehicle 100. Images photographed by the image sensor 110 may be stored as driving records. Here, the image sensor 110 may be a dashboard camera, a dash cam, or a car black box. The images may be used in an advanced driver assist system (ADAS) or an autonomous driving system. In another example, an image obtaining apparatus described herein may include the image sensor.

In response to the image sensor 110 photographing the front view of the vehicle 100, a shutter speed, an international organization for standardization (ISO), and an aperture of the image sensor 110 may be adjusted.

The shutter speed is associated with an exposure time. For example, the shutter speed is the exposure time. The exposure time indicates a length of time when the image sensor 110 is exposed to light when taking a photograph. For example, a shutter speed is expressed in terms of how long the shutter is open, for example, ⅟1000s, ⅟500s, ⅟250 s, ⅟125s, ⅟60 s, ⅟30s, ⅟15s, ⅛s, ¼s, ½s, and 1s. That is, a number indicating a shutter speed decreases as the shutter speed increases.

The ISO indicates a sensitivity of the image sensor 110. For example, a light sensitivity of the image sensor 110 increases as the ISO increases such that an amount of light sensed by the image sensor 110 when taking a photograph may increase.

The aperture indicates a hole of the image sensor 110 through which light passes when taking a photograph. A size of the aperture may be determined based on a diameter D of the hole through which light passes, and may be expressed in D=f/N. Here, f denotes a focal length and N denotes an f-number. For example, a unit value of N is expressed in f/32, f/22, f/16, f/11, f/8, f/5.6, f/4, f/2.8, f/2, and f/1.4, and an aperture value indicates an f-number in general. Thus, the aperture is opened more as the aperture value decreases.

In response to an image being photographed by incorrectly adjusting the shutter speed, the ISO, and/or the aperture of the image sensor 110, the photographed image may include a blur. The blur may occur when the vehicle 100 moves at a high velocity in a dark environment, but the blur may be effectively removed by adjusting the shutter speed to be faster. However, an amount of time during which the image sensor 110 is exposed to light decreases in response to the shutter speed being adjusted to be faster, so that the image may be photographed with a low brightness. Either one or both of the ISO and the aperture of the image sensor 110 may be adjusted such that the image may be prevented from being obtained as a low-brightness image.

Hereinafter, description about a process of obtaining an image of an appropriate brightness without a blur by adjusting the shutter speed, either one or both of the ISO and the aperture of the image sensor 110 based on vehicle information, for example, a velocity of a vehicle, is provided below.

Figure 2:
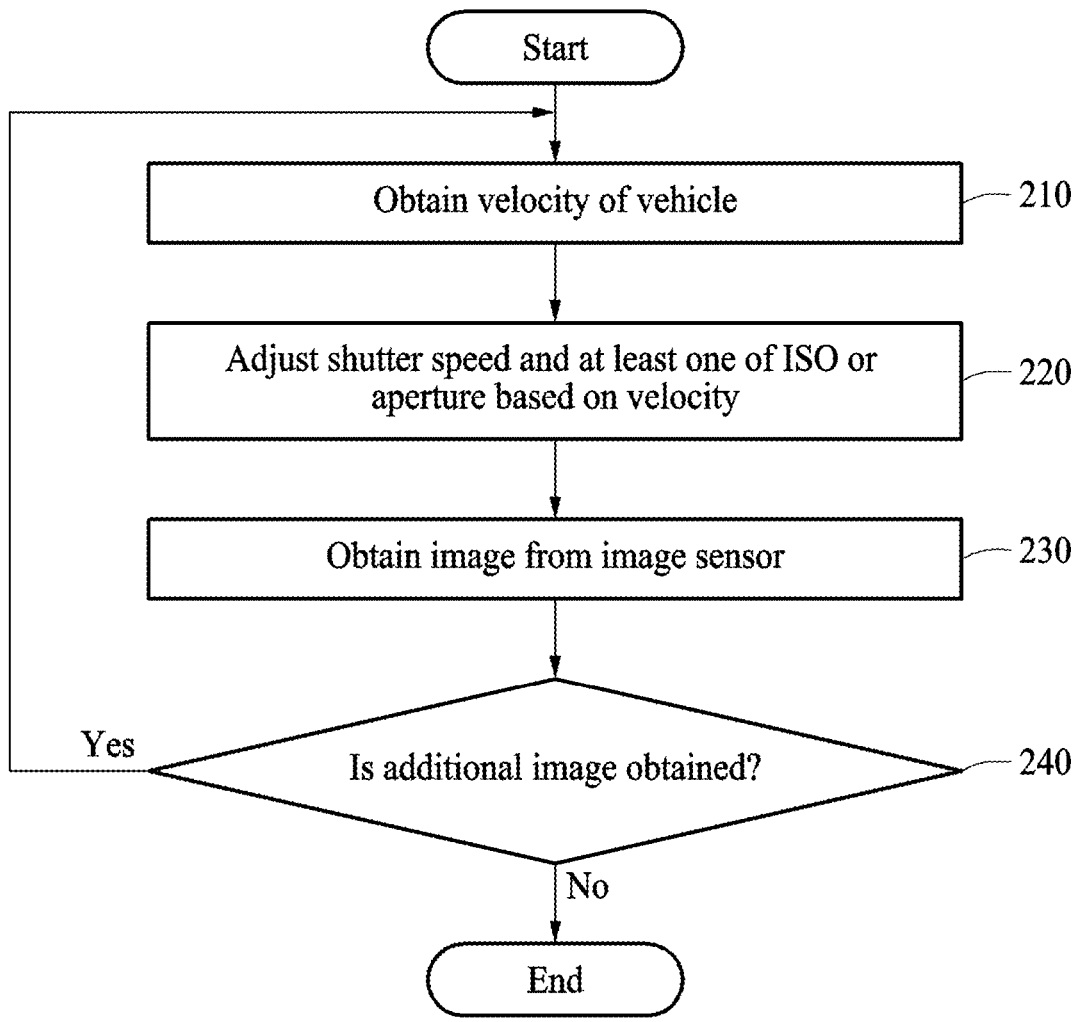
FIG. 2 is a flowchart illustrating an example of a method of obtaining an image.

FIG. 2 is a flowchart illustrating an example of a method of obtaining an image.

FIG. 2 illustrates an example of the method of obtaining the image performed by a processor of an image obtaining apparatus.

In operation 210, the image obtaining apparatus obtains a speed and/or a velocity of a vehicle. For example, the image obtaining apparatus obtains a velocity of a driving vehicle from a velocity sensor or an acceleration sensor included in the vehicle. Moreover, the image obtaining apparatus may include the velocity sensor and/or the acceleration sensor.

The image obtaining apparatus may obtain the velocity when the vehicle is driving straight, and obtain an angular velocity when the vehicle is turning right or left.

In operation 220, the image obtaining apparatus adjusts a shutter speed of an image sensor and either one or both of an international organization for standardization (ISO) of the image sensor and an aperture of the image sensor based on the velocity. For example, the shutter speed is adjusted to be faster as the velocity of the vehicle increases. Simultaneously, the image obtaining apparatus performs either one or both of an adjustment for increasing the ISO and an adjustment for opening the aperture. The image obtaining apparatus may prevent an occurrence of blur by rapidly adjusting the shutter speed, and prevent an image of a low-brightness by adjusting either one or both of the ISO and the aperture.

When the velocity is an angular velocity, the image obtaining apparatus may adjust the shutter speed to be faster than when the velocity is not the angular velocity. Related descriptions will be provided with reference to FIGS. 5 and 6.

In response to the image obtained from the image sensor including an object, the image obtaining apparatus adjusts the shutter speed of the image sensor based on a relative velocity between the object and the vehicle. For example, the image obtaining apparatus verifies whether the image obtained from the image sensor includes the object, and adjusts the shutter speed based on the relative velocity between the object and the vehicle in response to the image including the object. The image obtaining apparatus may adjust the shutter speed to be faster as the relative velocity increases.

In response to the image obtained from the image sensor including the object, the image obtaining apparatus adjusts the shutter speed of the image sensor based on a type of the object. Here, the type of object is associated with a classification of an object that can be observed from a driving vehicle. For example, the type of object includes a neighboring vehicle, a pedestrian, and/or a stationary object. The stationary object includes a traffic sign and/or a traffic light at a predetermined position.

In operation 230, the image obtaining apparatus obtains the image from the image sensor based on the adjusted shutter speed and/or the adjusted either one or both of the ISO and the aperture. For example, the image obtaining apparatus sets the image sensor based on the shutter speed and either one or both of, the ISO and the aperture adjusted in operation 220, and obtains the image from the image sensor.

In operation 240, the image obtaining apparatus verifies whether an additional image is requested. For example, the image obtaining apparatus verifies that the additional image is not requested in response to the vehicle being stopped. The image obtaining apparatus may verify that the vehicle is stopped in response to the vehicle not moving for a predetermined period of time, an engine of the vehicle being turned off, an advanced driver assist system (ADAS) or an autonomous driving system of the vehicle being shut down, and/or a velocity obtained from the velocity sensor or the acceleration sensor being below a predetermined threshold. In another example, even when the vehicle is stopped, the image obtaining apparatus verifies that the additional image is requested when a neighboring image, for example, a front view image, of the vehicle needs to be stored as a record or when a crash or a motion of a level greater than or equal to a predetermined level is detected from a parked vehicle.

In response to a verification that the additional image is requested, the image obtaining apparatus performs operations 210 through 230 again. In response to the verification that the additional image being not requested, the image obtaining apparatus may terminate an operation.

Figure 3:
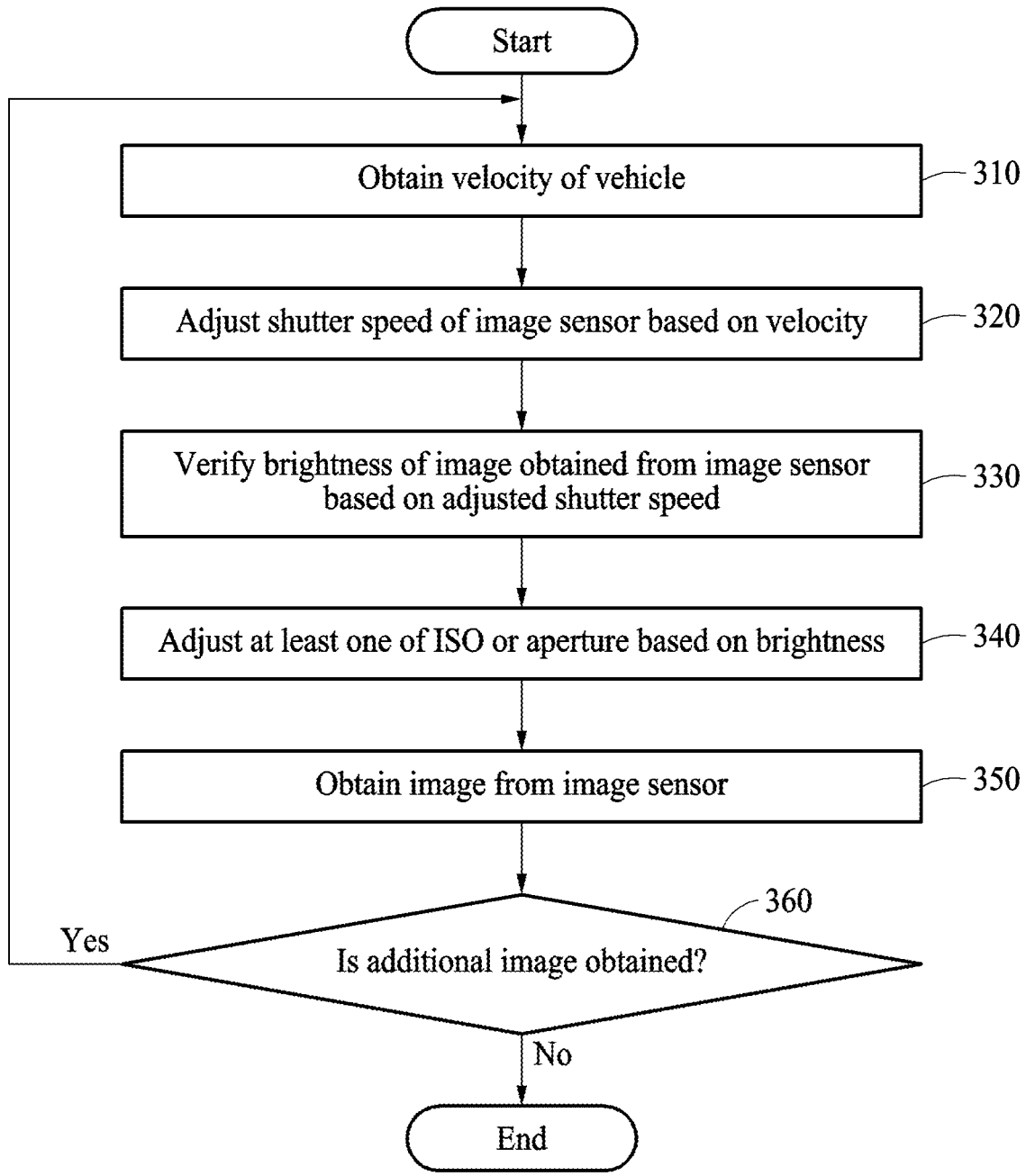
FIG. 3 is a flowchart illustrating another example of a method of obtaining an image.

FIG. 3 is a flowchart illustrating another example of a method of obtaining an image.

FIG. 3 illustrates another example of the method of obtaining the image performed by a processor of an image obtaining apparatus.

In operation 310, the image obtaining apparatus obtains a velocity of a vehicle. For example, the image obtaining apparatus obtains the velocity when the vehicle is driving straight, and obtains an angular velocity when the vehicle is turning, from a velocity sensor of the vehicle.

In operation 320, the image obtaining apparatus adjusts a shutter speed of an image sensor based on the velocity. The image obtaining apparatus may adjust the shutter speed to be faster as the velocity of the vehicle increases. The image obtaining apparatus may adjust the shutter speed to be faster than when the velocity is not the angular velocity.

In response to the image obtained from the image sensor including an object, the image obtaining apparatus may adjust the shutter speed of the image sensor based on a relative velocity between the object and the vehicle. In response to the image obtained from the image sensor including the object, the image obtaining apparatus may adjust the shutter speed of the image sensor based on a type of the object.

In operation 330, the image obtaining apparatus verifies a brightness (e.g., a level of brightness) of the image to be obtained from the image sensor based on the adjusted shutter speed. For example, the image obtaining apparatus determines a brightness based on light sensed by the image sensor while the shutter operates at the adjusted shutter speed. For example, when the shutter speed is adjusted without adjusting the ISO and the aperture, an image of a low brightness is obtained from the image sensor. Thus, the image obtaining apparatus may verify a degree of decrease in the brightness based on the shutter speed adjusted in operation 320 and adjust either one or both of the ISO and the aperture based on a result of verification in operation 340 and thus, the decrease in brightness may be compensated for.

In operation 340, the image obtaining apparatus adjusts either one or both of the ISO and the aperture of the image sensor based on the brightness. For example, the image obtaining apparatus performs either one or both of an adjustment for increasing the ISO and an adjustment for opening the aperture based on an amount of change in the brightness verified in operation 330.

The image obtaining apparatus may adjust either one or both of the ISO and the aperture of the image sensor to maintain the brightness at greater than a predetermined threshold. Here, the predetermined threshold may be a brightness value required for processing the image obtained from the image sensor in an advanced driver assist system (ADAS) or an autonomous driving system.

The image obtaining apparatus may priorly adjust the ISO of the image sensor based on the brightness verified in operation 330, and adjust the aperture of the image sensor in response to the brightness being less than the predetermined threshold by the adjusted ISO. For example, in response to the ISO being adjusted, the image obtaining apparatus may again determine a brightness based on light sensed by the image sensor while the shutter operates at the adjusted ISO. In response to the brightness being determined to be less than a predetermined threshold, the image obtaining apparatus may adjust the aperture in order to increase the brightness to above the threshold. In response to the brightness of the image obtained from the image sensor satisfying the predetermined threshold based on the adjustment for increasing the ISO of the image sensor, the aperture of the image sensor may not be additionally adjusted.

In operation 350, the image obtaining apparatus obtains the image from the image sensor based on the adjusted shutter speed and either one or both of the ISO and the aperture. For example, the image obtaining apparatus sets the image sensor based on the shutter speed adjusted in operation 320 and the either one or both of the ISO or the aperture adjusted in operation 340, and obtains the image from the image sensor.

In operation 360, the image obtaining apparatus verifies whether an additional image is requested. In an example, the image obtaining apparatus verifies that the additional image is not requested in response to the vehicle being stopped. In another example, even when the vehicle is stopped, the image obtaining apparatus verifies that the additional image is requested when a neighboring image, for example, a front view image, of the vehicle needs to be stored as a record or when a crash or a motion of a level greater than or equal to a predetermined level is detected from a parked vehicle.

In response to a verification that the additional image is requested, the image obtaining apparatus performs operations 310 through 350 again. In response to the verification that the additional image being not requested, the image obtaining apparatus may terminate an operation.

Figure 4:
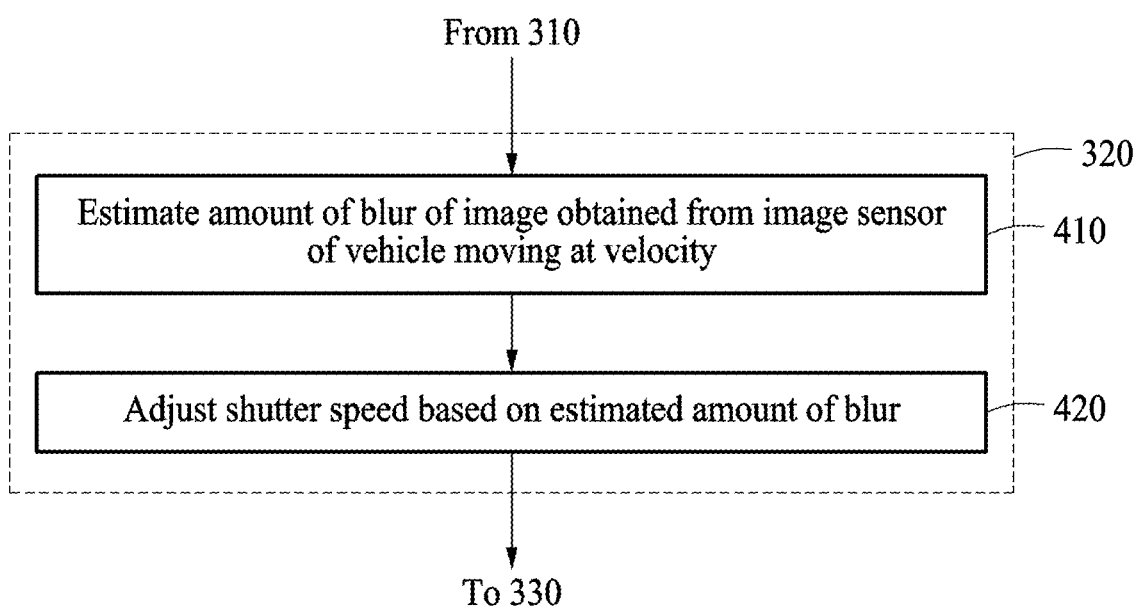
FIG. 4 is a flowchart illustrating an example of adjusting a shutter speed.

FIG. 4 is a flowchart illustrating an example of adjusting a shutter speed.

Referring to FIG. 4, an image obtaining apparatus may adjust a shutter speed by estimating an amount of blur based on a velocity instead of directly adjusting the shutter speed based on a velocity of a vehicle as described above.

In operation 410, the image obtaining apparatus estimates the amount of blur of the image obtained from the image sensor of the vehicle moving at the velocity obtained in operation 310. Here, the amount of blur of the image obtained without adjusting the shutter speed of the image sensor may be estimated.

In operation 420, the image obtaining apparatus adjusts the shutter speed based on the estimated amount of blur. For example, the image obtaining apparatus effectively prevent an occurrence of blur by adjusting the shutter speed to be faster as the amount of blur included in the image increases.

Figure 5:
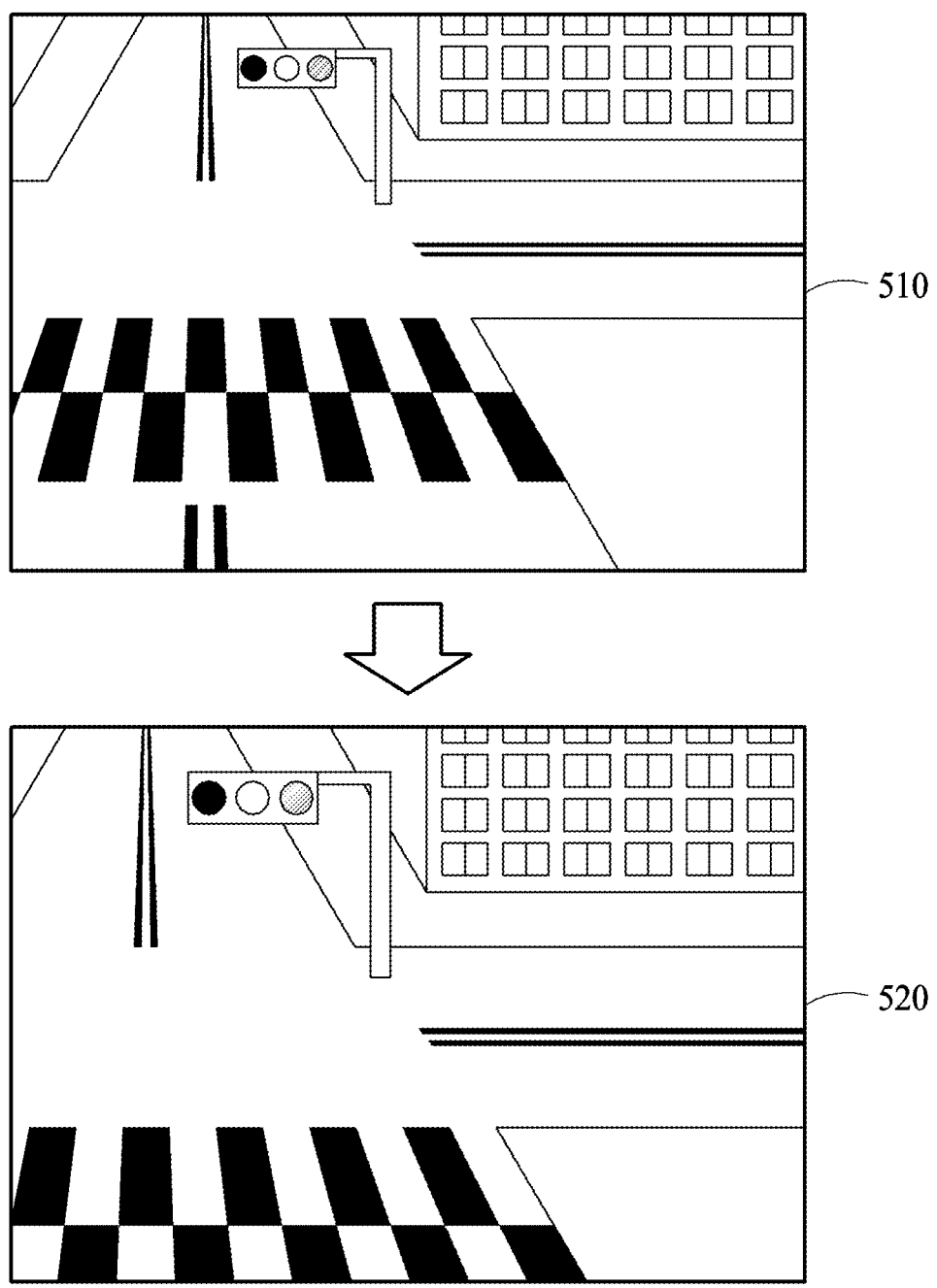
FIGS. 5 and 6 illustrate examples of an image obtained from a driving vehicle.
Figure 6:
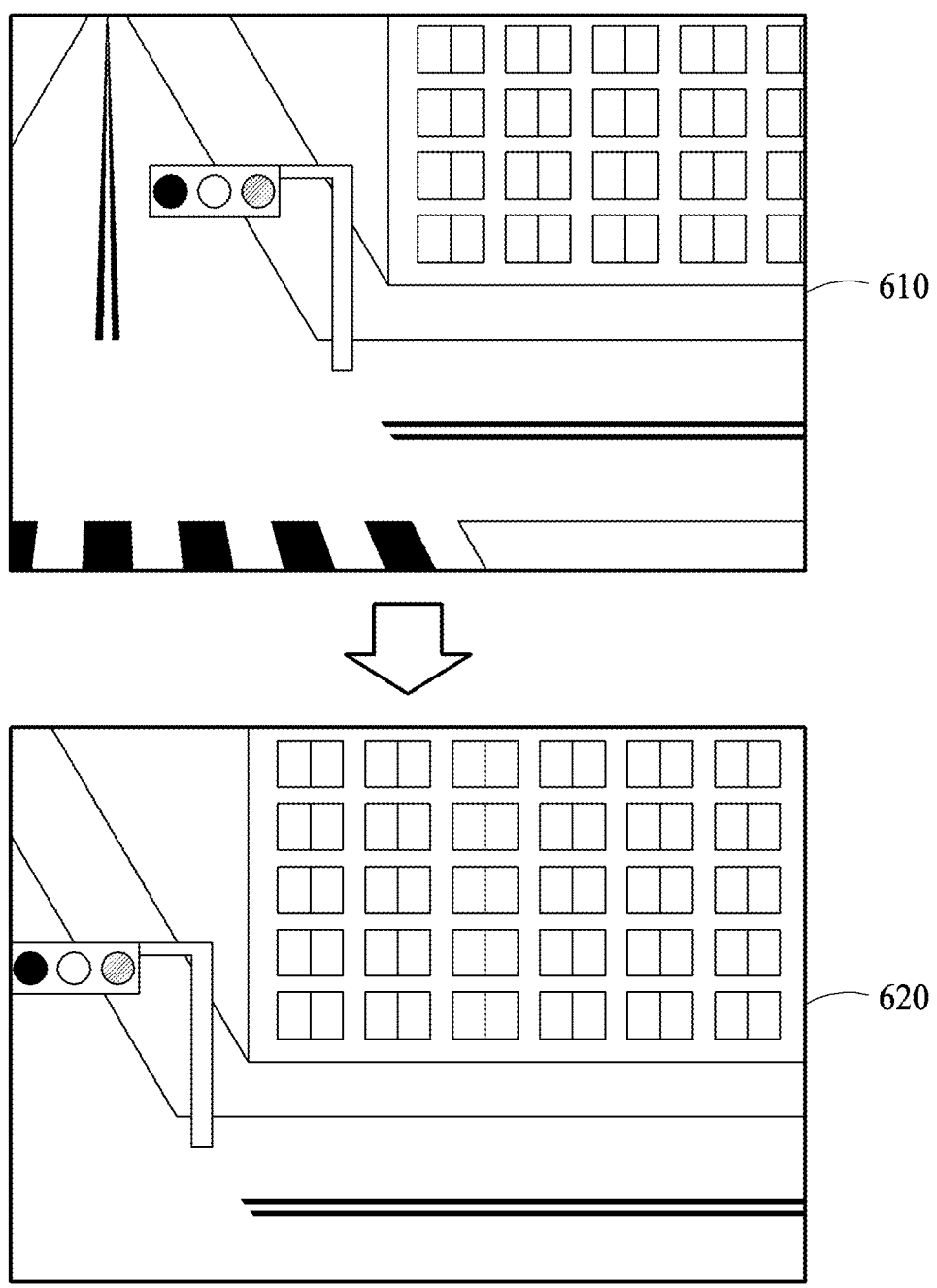

FIGS. 5 and 6 illustrate examples of an image obtained from a driving vehicle.

FIG. 5 illustrates images 510 and 520 that are sequentially obtained from a vehicle driving straight. The images 510 and 520 may be sequentially obtained from an image sensor when the vehicle enters crossroads. When the vehicle is driving straight, a size of an object included in the image 510 may increase in the image 520.

FIG. 6 illustrates images 610 and 620 that are sequentially obtained from a vehicle that is turning right. The images 610 and 620 may be sequentially obtained from the image sensor when the vehicle is turning right at the crossroads. When the vehicle is turning, objects included in the image 610 may be moved to the left in the image 620.

An amount of blur in an image may increase more when the vehicle is turning than when the vehicle is moving straight, since when the vehicle is turning, an object in the image may move to a great extent relatively. The blur may be effectively prevented by rapidly adjusting a shutter speed to be faster when the vehicle is turning than when the vehicle is moving straight.

When the vehicle is turning, an angular velocity may be sensed. In response to the angular velocity being sensed, an image obtaining apparatus may recognize that the vehicle is turning, and adjust the shutter speed to be faster than when the angular velocity is not sensed.

Figure 7:
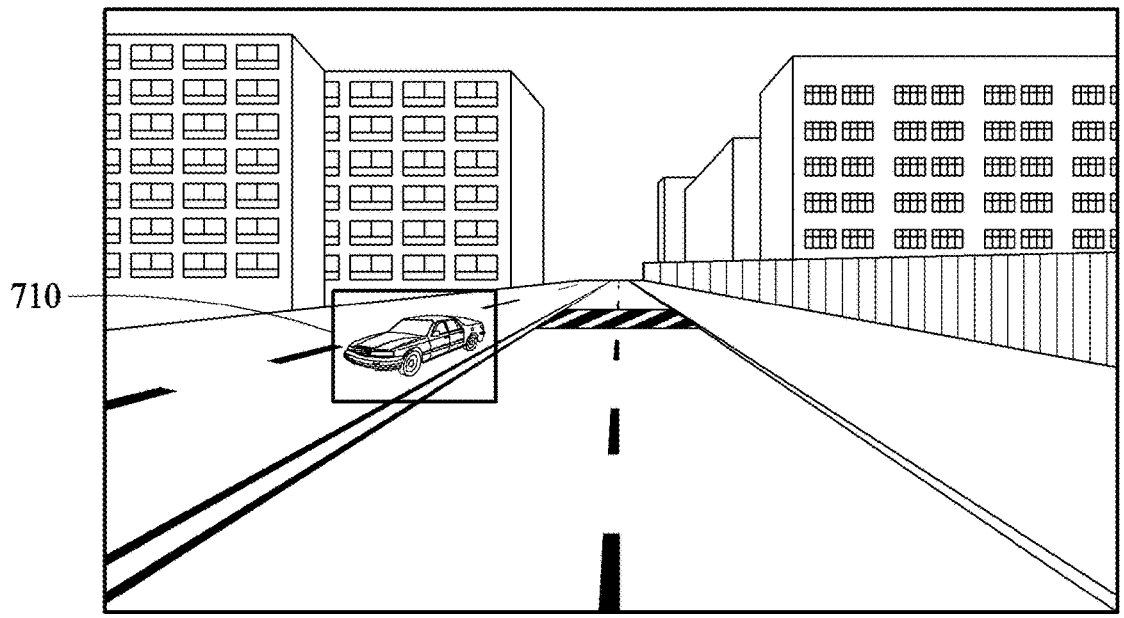
FIG. 7 illustrates an example of adjusting a shutter speed based on a relative velocity.

FIG. 7 illustrates an example of adjusting a shutter speed based on a relative velocity.

FIG. 7 illustrates an image obtained from an image sensor, and the image includes an object 710.

The object 710 is included in the image obtained from the image sensor. An image obtaining apparatus may determine a relative velocity between the object 710 and a vehicle by detecting a movement of the object 710, and adjust a shutter speed of the image sensor based on the determined relative velocity. The image obtaining apparatus may adjust the shutter speed to be faster as the relative velocity increases.

For example, when the object 710 is a neighboring vehicle driving in an opposite direction, the relative velocity is determined based on a sum of a velocity of the object 710 and a velocity of the vehicle. When the object 710 is a neighboring vehicle driving in a same direction, the relative velocity may be determined based on a difference between the velocity of the object 710 and the velocity of the vehicle. Thus, a relative velocity of the vehicle and the neighboring vehicle driving in the opposite direction may be greater than a relative velocity between the vehicle and the neighboring vehicle driving in the same direction. The image obtaining apparatus may adjust the shutter speed to be faster when the object 710 included in the image is the neighboring vehicle driving in the opposite direction than when the object 710 is the neighboring vehicle driving in the same direction.

To measure the relative velocity between the object 710 and the vehicle, an additional sensor may be used. For example, a radar sensor, a Lidar sensor, and/or an additional image sensor are used as an additional sensor. The image obtaining apparatus may measure the relative velocity between the object 710 and the vehicle based on information output from the radar sensor and the Lidar sensor. In terms of the additional image sensor, the image obtaining apparatus may measure the relative velocity between the object 710 and the vehicle using images obtained from two image sensors as a stereo image. In another example, the image obtaining apparatus may measure the relative velocity between the object 710 and the vehicle based on a change in position of the object 710 detected from a plurality of sequential images of the object 710.

Figure 8:
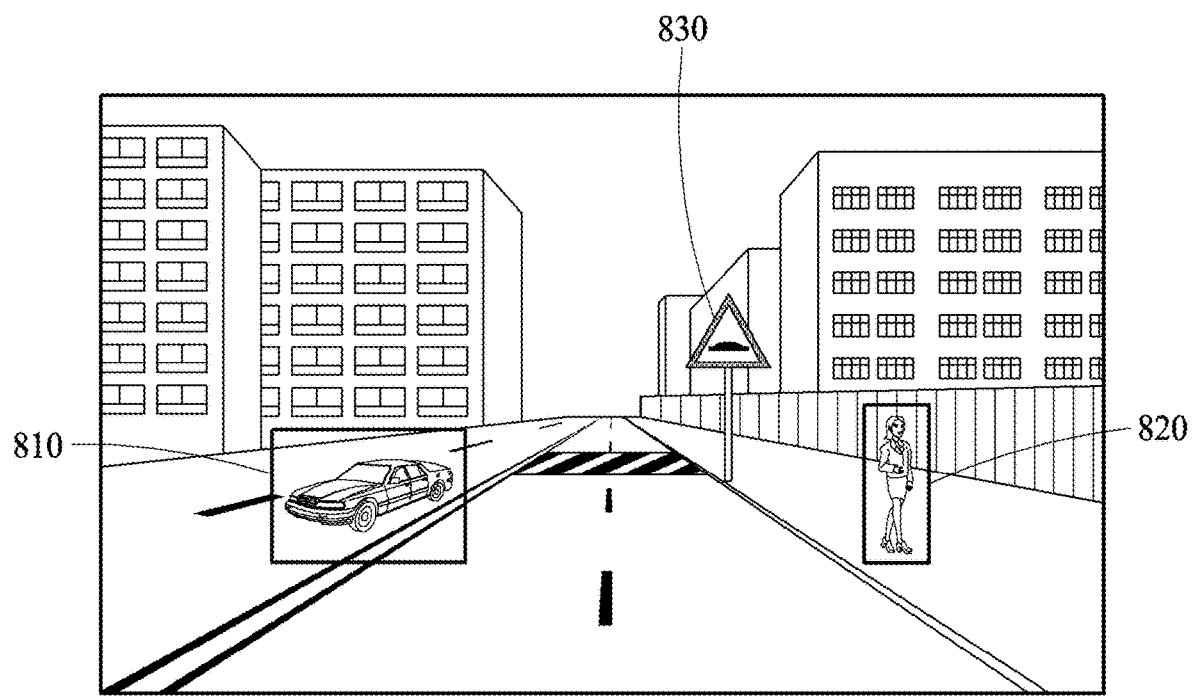
FIG. 8 illustrates an example of adjusting a shutter speed based on an object.

FIG. 8 illustrates an example of adjusting a shutter speed based on an object.

FIG. 8 illustrates an image obtained from an image sensor. The image includes a neighboring vehicle 810, a pedestrian 820, and a stationary object 830.

An image obtaining apparatus may verify whether the image obtained from the image sensor includes an object and adjust a shutter speed of the image sensor based on a type of the object in response to the image including the object. The type of object is associated with a classification of object to be observed from a driving vehicle. For example, a type of object includes the neighboring vehicle 810, the pedestrian 820, and the stationary object 830. The stationary object 830 includes, for example, a traffic sign and/or a traffic light at a predetermined position.

For example, a moving velocity of the neighboring vehicle 810 is greatest among the neighboring vehicle 810, the pedestrian 820, and the stationary object 830. When the type of object included in the image is the neighboring vehicle 810, the image obtaining apparatus may correct a blur by adjusting the shutter speed to be faster than when the object is the pedestrian 820 or the stationary object 830. The stationary object 830 is an object fixed at a predetermined position on a road. A moving velocity of the stationary object 830 may be smallest among the neighboring vehicle 810, the pedestrian 820, and the stationary object 830. Thus, when the type of object included in the image is the stationary object 830, the image obtaining apparatus may effectively correct the blur by adjusting the shutter speed to be slower than when the object is the neighboring vehicle 810 or the pedestrian 820. When the type of object included in the image is the pedestrian 820, the image obtaining apparatus may adjust the shutter speed to be slower than when the object is the neighboring vehicle 810, and adjust the shutter speed to be faster than when the object is the stationary object 830.

In response to one image including any combination of any two or more of the neighboring vehicle 810, the pedestrian 820, and the stationary object 830, the image obtaining apparatus may determine a main object among the objects included in the image and adjust the shutter speed of the image sensor based on a type of the main object. For example, the image obtaining apparatus may determine, as a main object, an object to which the vehicle and/or a driver of the vehicle should be alerted of most, for example, an object moving at a highest velocity, an object approaching the vehicle, and an object closest to the vehicle, among the objects included in the image.

The type of object may be determined by applying an image recognizing scheme to the image obtained from the image sensor. The type of object may be determined using an additional sensor, for example, a radar sensor, a Lidar sensor, and an additional image sensor.

Figure 9:
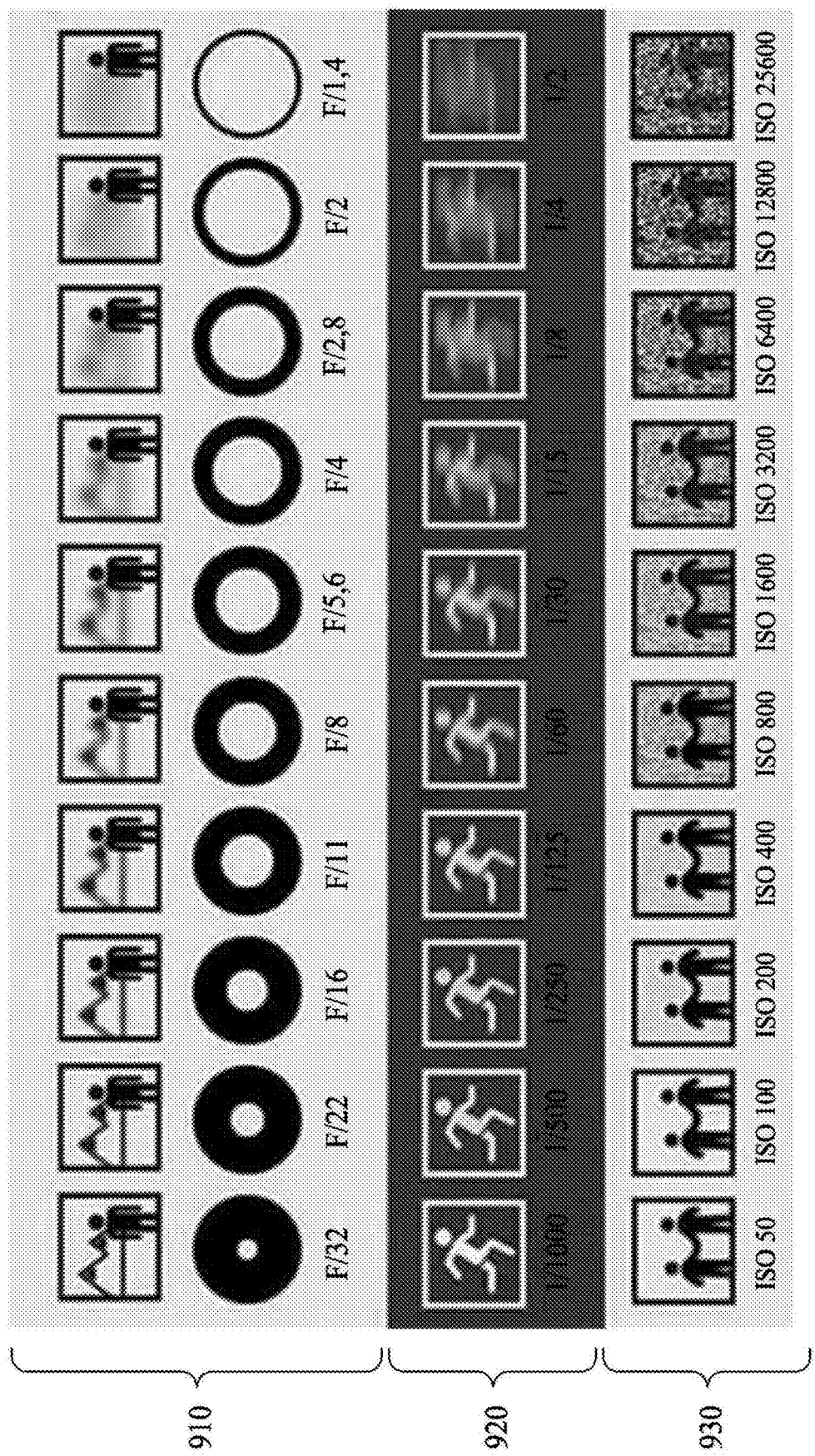
FIG. 9 illustrates an example of a shutter speed, an international organization for standardization (ISO), and an aperture.

FIG. 9 illustrates an example of a shutter speed, an international organization for standardization (ISO), and an aperture.

FIG. 9 illustrates an example of a relationship between an aperture 910, a shutter speed 920, and an ISO 930.

The shutter speed 920 is associated with an exposure time. The exposure time indicates a length of time when an image sensor is exposed to light when taking a photograph. For example, a shutter speed is expressed in, for example, $\frac{1}{1000}$s, $\frac{1}{500}$s, $\frac{1}{250}$s, $\frac{1}{125}$s, $\frac{1}{60}$s, $\frac{1}{30}$s, $\frac{1}{15}$s, $\frac{1}{8}$s, $\frac{1}{4}$s, and $\frac{1}{2}$s. A number indicating the shutter speed 920 may decrease as the shutter speed 920 is fast. In FIG. 9, the shutter speed 920 is faster to the left in FIG. 9 such that an occurrence of blur is prevented, but a brightness of an image may decrease.

The aperture 910 indicates a hole of the image sensor through which light passes when taking a photograph. A size of the aperture 910 may be determined based on a diameter D of the hole through which light passes, and may be expressed in D=f/N, for example, f/32, f/22, f/16, f/11, f/8, f/5.6, f/4, f/2.8, f/2, and f/1.4. Here, f denotes a focal length and N denotes an f-number. As an aperture value indicates an f-number, the aperture is more opened as the aperture value decreases. The aperture 910 is opened more as the aperture value decreases to the right in FIG. 9 such that the brightness of the image may increase.

The ISO 930 indicates of a sensitivity of the image sensor. For example, a light sensitivity of the image sensor increases as the ISO 930 increases such that an amount of light sensed by the image sensor when taking a photograph may increase. The ISO 930 increases to the right in FIG. 9, and the brightness of the image may increase.

A velocity of the vehicle, and the relationship between the aperture 910, the shutter speed 920, and the ISO 930 are expressed as shown in Equation 1.

$$\frac{I}{SA^2} \cong f(v) \qquad [\text{Equation 1}]$$

In Equation 1, v denotes the velocity of the vehicle, I denotes the ISO 930, S denotes the shutter speed 920, and A denotes the aperture value.

Figure 10:
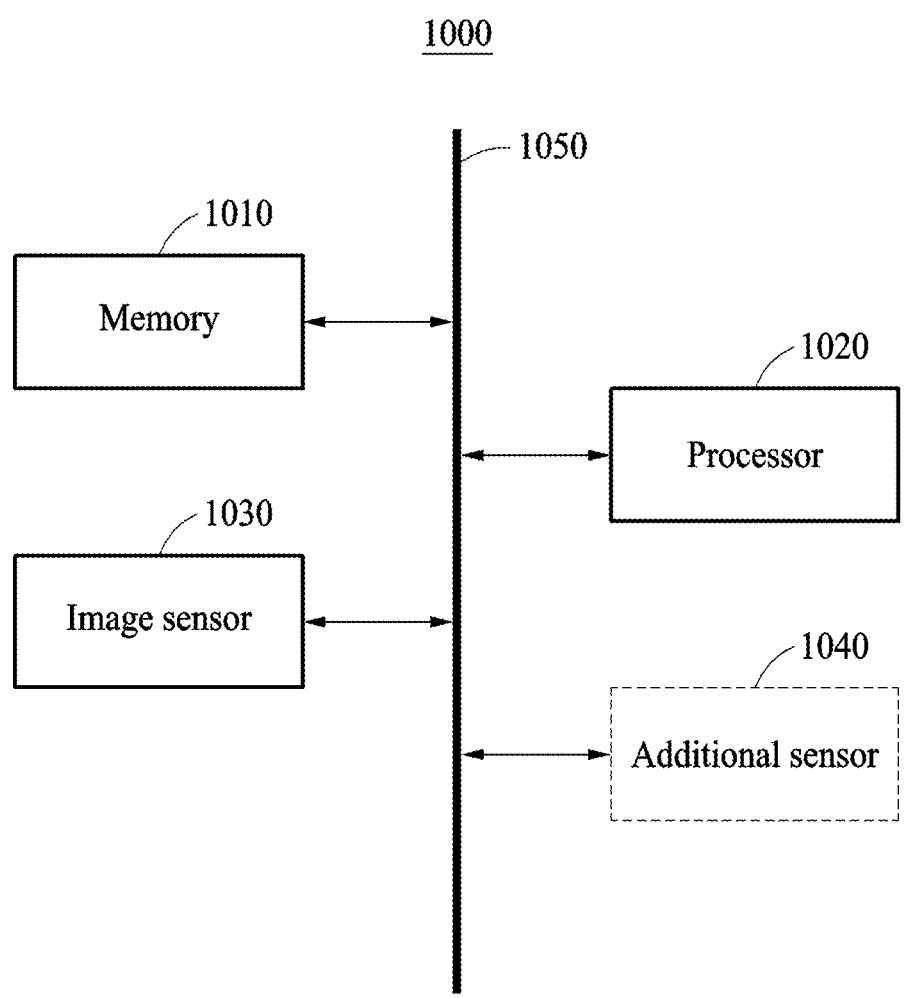
FIG. 10 is a block diagram illustrating an example of an image obtaining apparatus.

FIG. 10 is a block diagram illustrating an example of an image obtaining apparatus.

Referring to FIG. 10, an image obtaining apparatus 1000 includes a memory 1010, a processor 1020, and an image sensor 1030. The image sensor 1030 further includes an additional sensor 1040. The memory 1010, the processor 1020, the image sensor 1030, and the additional sensor 1040 communicate with each other via a bus 1050.

The memory 1010 includes a volatile memory and a non-volatile memory, and stores information received via the bus 1050. The memory 1010 includes at least one instruction to be executable by the processor 1020. The memory 1010 may store the above-described feature parameter.

The processor 1020 may execute programs or instructions stored in the memory 1010. The processor 1020 obtains a velocity of a vehicle, adjusts a shutter speed and either one or both of an international organization for standardization (ISO) and an aperture of the image sensor 1030 based on the velocity, and obtains an image from the image sensor 1030 based on the adjusted shutter speed and the adjusted either one or both of the ISO and the aperture.

The image sensor 1030 may be attached to a predetermined position of the vehicle to photograph a neighboring image, for example, a front view image, of the vehicle. The image sensor 1030 may photograph the image based on the shutter speed and the either one or both of the ISO and the aperture adjusted by the processor 1020.

The additional sensor 1040 includes any one or any combination of any two or more of a velocity sensor, an acceleration sensor, and an angular velocity sensor. The velocity sensor, the acceleration sensor, and the angular velocity sensor may measure a velocity and an angular velocity of the vehicle. The additional sensor 1040 includes any one or any combination of any two or more of a radar sensor, a Lidar sensor, and an additional image sensor. The radar sensor, the Lidar sensor, the additional image sensor may sense a relative velocity between the vehicle and an object included in the image or verify a type of the object.

Repeated descriptions will be omitted for increased clarity and conciseness because the descriptions provided above are also applicable to the image obtaining apparatus 1000.

The battery image sensor, the shutter, the image obtaining apparatus, the acceleration sensor, the angular velocity sensor, the memory 1010, the processor 1020, the image sensor 1030, the additional sensor 1040, and the bus 1050 in FIGS. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of obtaining an image from an image sensor provided in a vehicle, the method comprising:
    obtaining a vehicle speed of the vehicle;
    estimating an amount of blur of an first image based on the obtained vehicle speed;
    in response to the estimating of the amount of blur, adjusting a shutter speed of the image sensor based on the estimated amount of blur of the first image;
    in response to adjusting of the shutter speed,
        determining a brightness based on light sensed based on the adjusted shutter speed, and
        adjusting either one or both of an international organization for standardization (ISO) sensitivity and an aperture of the image sensor based on the determined brightness; and
    obtaining a second image from the image sensor based on the adjusted shutter speed and the adjusted either one or both of the ISO and the aperture.

2. The method of claim 1, wherein:
    the adjusting of the shutter speed comprises increasing the shutter speed in response to an increase in the estimated amount of blur; and
    the adjusting of the either one or both of the ISO and the aperture comprises performing either one or both of an adjustment for increasing the ISO and an adjustment for opening the aperture.

3. The method of claim 1,
    wherein the adjusting of the shutter speed comprises adjusting the shutter speed to be faster in response to the vehicle speed being an angular vehicle speed sensed when the vehicle is turning, than in response to the vehicle speed not being the angular speed.

4. The method of claim 1,
    wherein the adjusting of the shutter speed comprises:
    identifying an object which is captured in the first image obtained from the image sensor;
    calculating a relative speed between the identified object and the vehicle; and
    adjusting the shutter speed based the a relative speed between the object and the vehicle.

5. The method of claim 4, wherein the adjusting of the shutter speed comprises increasing the shutter speed in response to an increase in the relative speed between the object and the vehicle.

6. The method of claim 1, wherein the adjusting of the shutter speed comprises:
    identifying an object which is captured in the first image obtained from the image sensor;
    determining a type of the object;
    adjusting the shutter speed based on a type of the object.

7. The method of claim 6, wherein the adjusting of the shutter speed comprises adjusting the shutter speed to be faster in response to the object being a neighboring vehicle than in response to the object being a pedestrian or a stationary object at a predetermined position.

8. The method of claim 6, wherein the adjusting of the shutter speed comprises:
adjusting the shutter speed to be faster in response to the type of the object being a neighboring vehicle than in response to the type of the object being a pedestrian or a stationary object.

9. The method of claim 6, wherein the adjusting of the shutter speed comprises adjusting the shutter speed to be slower in response to the object being a stationary object at a predetermined position than in response to the object being a neighboring vehicle or a pedestrian.

10. The method of claim 1,
wherein the adjusting of the shutter speed comprises adjusting the shutter speed based on the vehicle speed.

11. The method of claim 1, wherein the adjusting of either one or both of the ISO and the aperture based on the brightness comprises adjusting either one or both of the ISO and the aperture so that the brightness is greater than a predetermined threshold.

12. The method of claim 1, wherein the adjusting of either one or both of the ISO and the aperture based on the brightness comprises:
adjusting the ISO based on the brightness, and
adjusting the aperture in response to another brightness based on light sensed by the image sensor at the adjusted ISO being less than a predetermined threshold.

13. The method of claim 1, further comprising:
verifying whether the vehicle is stopped,
wherein the obtaining of the vehicle speed, the adjusting, and the obtaining of the image are iteratively performed until the vehicle is stopped.

14. A non-transitory computer-readable storage medium storing instructions that, when executed by a processor, cause the processor to perform the method of claim 1.

15. An image obtaining apparatus for obtaining an image from an image sensor provided in a vehicle, the image obtaining apparatus comprising:
a processor; and
a memory comprising at least one instruction executable by the processor,
wherein, in response to the instruction being executed by the processor, the processor is configured to:
obtain a vehicle speed of the vehicle,
estimate an amount of blur of an first image based on the obtained vehicle speed,
in response to the estimation of the amount of blur, adjust a shutter speed of the image sensor based on the estimated amount of blur of the first image,
in response to the adjustment of the shutter speed
determine a brightness based on light sensed based on the adjusted shutter speed,
adjust either one or both of an international organization for standardization (ISO) and an aperture of the image sensor based on the determined brightness, and
obtain a second image from the image sensor based on the adjusted shutter speed and the adjusted either one or both of the ISO and the aperture.

16. The image obtaining apparatus of claim 15, wherein the processor is configured to:
increase the shutter speed in response to an increase in the estimated amount of blur, and
perform either one or both of an adjustment for increasing the ISO and an adjustment for opening the aperture.

17. The image obtaining apparatus of claim 15, wherein the processor is configured to:
adjust the shutter speed based on the vehicle speed, and
adjust either one or both of the ISO and the aperture based on the adjusted shutter speed.

18. The image obtaining apparatus of claim 15, wherein the processor is configured to adjust either one or both of the ISO and the aperture so that the brightness is greater than a predetermined threshold.

\* \* \* \* \*